United States Patent
Dong et al.

(10) Patent No.: US 9,911,985 B2
(45) Date of Patent: Mar. 6, 2018

(54) INORGANIC MICROPOROUS ION EXCHANGE MEMBRANES FOR REDOX FLOW BATTERIES

(71) Applicants: Junhang Dong, Cincinnati, OH (US); Zhi Xu, Cincinnati, OH (US); Lin-Feng Li, Peekskill, NY (US); Ruidong Yang, Rapid City, SD (US)

(72) Inventors: Junhang Dong, Cincinnati, OH (US); Zhi Xu, Cincinnati, OH (US); Lin-Feng Li, Peekskill, NY (US); Ruidong Yang, Rapid City, SD (US)

(73) Assignees: University Of Cincinnati, Cincinnati, OH (US); Bettergy Corp., Peekskill, NY (US)

( * ) Notice: Subject to any disclaimer, the term of this patent is extended or adjusted under 35 U.S.C. 154(b) by 801 days.

(21) Appl. No.: 14/454,076

(22) Filed: Aug. 7, 2014

(65) Prior Publication Data
US 2015/0044537 A1    Feb. 12, 2015

Related U.S. Application Data

(60) Provisional application No. 61/864,122, filed on Aug. 9, 2013, provisional application No. 62/010,051, filed on Jun. 10, 2014.

(51) Int. Cl.
*C08J 5/22* (2006.01)
*H01M 8/0245* (2016.01)
(Continued)

(52) U.S. Cl.
CPC ......... *H01M 8/0245* (2013.01); *C08J 5/2281* (2013.01); *H01M 8/1055* (2013.01);
(Continued)

(58) Field of Classification Search
None
See application file for complete search history.

(56) References Cited

U.S. PATENT DOCUMENTS 5,779,904 A * 7/1998 Ruderman ......... B01D 67/0051
                                                210/490
6,352,742 B1    3/2002 Murata et al.
(Continued)

FOREIGN PATENT DOCUMENTS

CN    101383404 A    3/2009
DE    102009010596 A1    8/2010
(Continued)

OTHER PUBLICATIONS

Chaiwat Yoonoo et al: "Nafion/mordenite composite membranes for improved direct methanol fuel cell performance", Journal of Membrane Science, Elsevier, vol. 369, No. 1, Dec. 10, 2010 (Dec. 10, 2010), pp. 367-374, XP028134471, ISSN: 0376-7388, DOI: 10.1016/J.MEMSCI.2010.12.030 [retrieved on Dec. 21, 2010].
(Continued)

*Primary Examiner* — Rena Dye Cronin
(74) *Attorney, Agent, or Firm* — Wood Herron & Evans LLP

(57) ABSTRACT

A composite structure comprising a layer of zeolite having a high silica to alumina ratio supported on a support layer acts as a separator in a redox flow battery. The zeolite can be either supported on a rigid substrate, such as alumina, or a flexible substrate, such as a polymeric film. The polymeric film, in particular, can be an ion exchange membrane such as Nafion. The zeolite layer with a high silica to aluminum ratio provides a long-lasting separator for redox flow batteries.

10 Claims, 4 Drawing Sheets

(51) Int. Cl.
*H01M 8/18* (2006.01)
*H01M 8/20* (2006.01)
*H01M 8/1041* (2016.01)
*H01M 8/1023* (2016.01)
*H01M 8/103* (2016.01)
*H01M 8/1067* (2016.01)

(52) U.S. Cl.
CPC .......... *H01M 8/188* (2013.01); *H01M 8/20* (2013.01); *H01M 8/103* (2013.01); *H01M 8/1023* (2013.01); *H01M 8/1067* (2013.01); *H01M 2250/10* (2013.01); *H01M 2300/0071* (2013.01); *H01M 2300/0082* (2013.01); *H01M 2300/0094* (2013.01); *Y02B 90/14* (2013.01); *Y02E 60/521* (2013.01); *Y02E 60/528* (2013.01)

(56) References Cited

U.S. PATENT DOCUMENTS

| | | | | |
|---|---|---|---|---|
| 6,494,326 | B1* | 12/2002 | Nenoff | B01D 69/12 210/483 |
| 8,119,305 | B2* | 2/2012 | Markoski | H01M 2/14 429/500 |
| 2006/0034757 | A1* | 2/2006 | Yan | B01D 67/0051 423/707 |
| 2010/0003545 | A1* | 1/2010 | Horne | B60L 11/1824 429/471 |
| 2011/0223450 | A1* | 9/2011 | Horne | B60L 11/1824 429/72 |
| 2012/0058370 | A1* | 3/2012 | Kell | H01M 2/38 429/51 |
| 2014/0120431 | A1* | 5/2014 | Roelofs | H01M 8/1058 429/408 |

FOREIGN PATENT DOCUMENTS

| | | |
|---|---|---|
| GB | 2348046 A | 9/2000 |
| JP | H0541239 A | 2/1993 |
| WO | 2012020268 A1 | 2/2012 |

OTHER PUBLICATIONS

Qizhao Huang et al: "Reversible chemical delithiation/lithiation of LiFePO4: towards a redox flow lithium-ion battery", Physical Chemistry Chemical Physics, vol. 15, No. 6, Jan. 1, 2013 (Jan. 1, 2013), p. 1793, XP055164315, ISSN: 1463-9076, DOI: 10.1039/c2cp44466f.

International Search Report and Written Opinion from corresponding PCT/US2014/050150, dated Feb. 24, 2015 (19 pages).

First Office Action from corresponding Chinese Appln S.No. 201480055684.3, with translation, dated May 2, 2017, 16 pages.

* cited by examiner

INORGANIC MICROPOROUS ION EXCHANGE MEMBRANES FOR REDOX FLOW BATTERIES

RELATED APPLICATION

The present application claims priority to U.S. Ser. No. 61/864,122 filed Aug. 9, 2013, and U.S. Ser. No. 62/010,051 filed Jun. 10, 2014, the disclosures of which is hereby incorporated herein by reference in their entirety.

BACKGROUND OF THE INVENTION

Redox-flow batteries (RFB) are attracting broad interest for electrical energy storage in solar and wind power systems and large-scale electric grids because of their low-cost, safety and small environmental footprints. The RFB operates on electrode reactions of dissolved red-ox metal ion couples separated by an ion exchange membrane (IEM). The IEM is ideally electronically insulating and highly permeable to the nonreactive ion charge carriers but impermeable to the reactive metal ions. To date, RFBs are mostly based on proton-selective, perfluorinated or non-perfluorinated ionic polymer IEMs. However, in the extremely acidic and oxidizing RFB electrolyte solutions, the polymeric IEMs have common issues of metal ion crossover and material degradation over long term that limit the cell efficiency and the lifetime.

Zeolites are crystalline aluminosilicates with enormous internal surface area, large porosity and uniform pore diameters ranging from 0.3 nm to over 1 nm depending on the specific crystallographic structure. The zeolite framework is formed by $[SiO_4]$ and $[AlO_4]$ tetrahedrons interlinked through corner oxygen ions and large numbers of exchangeable extraframework cations exist in the zeolitic channels as charge compensators for $[AlO_4]$ sites. The pore size and chemical and physical properties of zeolite materials can be fine-tuned by framework isomorphous elemental substitution and extraframework ion exchange during and after synthesis. Over the last few decades, various types of zeolite membranes have been developed for gas and liquid separations based on molecular size discrimination or competitive molecular adsorption-diffusion mechanisms. In recent years, zeolite membranes were also demonstrated for water purification from salt solutions by size-exclusion (steric) effect because metal ions are bonded with surrounding water molecules to form hydration shells making the hydrated ion size too large to enter the zeolitic pores. The kinetic size of hydrated metal ion increases with the ion charge density, i.e. electrical charge per volume of the ion. Unlike metal ions, protons in aqueous solutions exists in the form of $H_3O^+$ (hydronium) with three identical "H—O" bonds making it a polyatomic ion with charge density too small to form a definable hydration shell. The kinetic size of the $H_3O^+$ is thus much smaller than the hydrated multivalent metal cations commonly involved in various RFB systems.

SUMMARY OF THE INVENTION

The present invention provides a composite structure which is suitable as a separator in an RFB system. The composite is an ion exchange membrane which incorporates a layer of zeolite on a support layer wherein the zeolite has a ratio of silicon to aluminum of greater than about five. According to the present invention, the thickness of the zeolite layer can be from less than 1 μm to 100 μm with an intracrystalline pore size of generally around 0.3 nm up to about 1.0 nm.

According to one embodiment, the zeolite layer is supported on alumina. In another embodiment, the support is a polymeric film or membrane, such as an ion exchange membrane such as Nafion.

Further, the present invention provides a redox flow battery incorporating, as a separator, a zeolite layer. The zeolite layer may be supported on a substrate such as porous ceramic like alumina or an ion exchange resin such as perfluorosulfonic acid membrane such as Nafion or polybenzylimidazole (PBI).

The present invention will be further appreciated in light of the following detailed description and drawings in which:

BRIEF DESCRIPTION OF THE DRAWINGS

FIG. 3 is a graph showing Proton and $V^4$ ($VO^2$) ion concentration in the permeate side $MgSO_4$ solution as a function of;

DETAILED DESCRIPTION

According to the present invention, a zeolite membrane is used as a separator in a redox flow battery system. The zeolite layer has a ratio of silicon to aluminum atoms which can be varied. For use in the present invention, the ratio of silicon to aluminum must be greater than five to one and up to a ratio containing no aluminum whatsoever. Generally the silicon to aluminum ratio will be about 10 to 50. A silicon to aluminum ratio much higher than 50 results in low proton concentration in the zeolite porosity after ion exchange in acidic electrolyte solutions that leads to low ionic conductivity and hence low energy efficiency of the battery; on the contrary, when the silicon to aluminum ratio is much lower than 10, severe dealumination of the zeolite framework in acidic solutions may cause a collapse of the zeolite crystal structure overtime and consequently lower the battery lifetime.

The thickness of the zeolite layer should be from about 1 to about 100 μm. Generally, it will be 3 to 50 μm, with about 1 to 10 μm in certain situations. The pore size of the zeolite layer should be from about 0.3 to about 1.0 nm and generally from 0.30 nm to 0.60 nm.

The zeolite material itself is generally retained on a support. Any support which will not interfere with the redox flow battery and is chemically and structurally strong enough in the RFB electrolyte solutions can be used in the present invention. It can be, for example, a rigid, porous material such as ceramics and surface-passivated metal alloys or alternately it can be a polymeric layer or matrix. Any porous inert polymeric material can be used as a support for the present invention. Further, particular supports include ion exchange membranes such as perfluorosulfonic acid membrane sold under the trademark Nafion or polybenzylimidazole (PBI). Other suitable polymeric supports include cation or anion exchange polymers.

Figure 1:
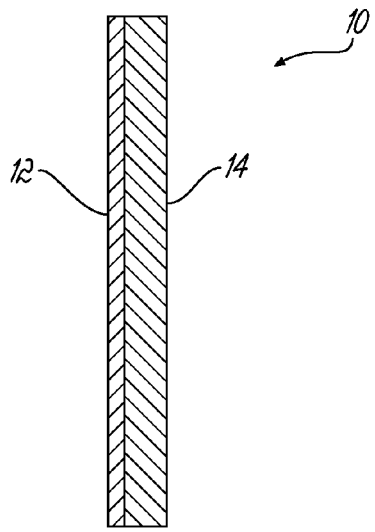
FIG. 1 is a diagrammatic depiction of a composite of the present invention.

The support layer will generally be from about 10 µm to 500 µm for polymer materials and about 100 µm to 4000 µm for porous ceramic or metal alloy materials. More typically, support layer will generally be from about 25 µm to 200 µm for polymer materials and about 250 µm to 1500 µm for porous ceramic or metal alloy materials. FIG. 1 shows a diagrammatic depiction of the composite 10 of the present invention wherein the composite 10 incorporates a zeolite layer 12 and a support layer 14.

With respect to FIG. 1, a zeolite-CEM (e.g. Nafion) composite membrane that consists of a colloidal silicalite skin 12 and a CEM (e.g. Nafion) base layer 14 can be prepared by the suspension casting method for use as IEMs in the VRFB. Such a "colloidal zeolite-ionic polymer" layered composite IEM combines the advantages of high proton-selectivity of the zeolite layer and the mechanical flexibility and low electrical resistance of the ionic polymer thin membrane.

The zeolite layer 12 can be formed on a solid supporting sheet 14, such as alumina disc, by the seeded secondary growth method or the in-situ crystallization method in which a precursor solution with desired molar ratios of silica, alumina, sodium oxide, potassium oxide and water combined with or without the use of zeolite structure directing agents (SDA). Other porous ceramic supports, such as zirconia, titania, silica, and their solid solutions, and porous metal alloys, such as surface passivated steel, aluminum, titanium based alloys, can also be used as supports. The supports can be of various geometries, such as flat sheets, tobue, multi-channel monolithics and other structures like V-shaped and curved surfaces for larger membrane packing density that would provide higher power density of the battery.

When the zeolite membrane is synthesized by the seeded secondary growth method on an alumina disc, the substrate surfaces are seeded with zeolite crystals and the seed layer is subsequently grown into a continuous film by hydrothermal treatment in the synthesis solution. For example, in the seeded secondary growth preparation of zeolite-T membrane, zeolite-T crystals (average particle size of ~0.3 µm) by dip-coating with 1 wt. % zeolite colloidal suspension. The seeds are made from zeolite-T particles of about 1.4 µm in average particle size by ball-milling. The dip-coated discs are dried at 60° C. in air for overnight before secondary growth synthesis. The secondary growth synthesis solution includes desired portions an sodium aluminate (optional) (50-56% $Al_2O_3$, Sigma-Aldrich), colloidal silica (Ludox SM-30, Sigma-Aldrich), sodium hydroxide (96%, Sinopharm Chemical Reagent Co., Ltd, China) and potassium hydroxide (85%, Sinopharm Chemical Reagent Co., Ltd, China) in D.I. water at room temperature. The molar composition of synthesis solution $SiO_2:Al_2O_3:Na_2O:K_2O:H_2O$ is established to provide a Si/Al ratio of at least 5. The hydrothermal crystallization process is carried out in an autoclave at 100° C. for 40 h. The as-synthesized zeolite membranes is washed by D.I. water thoroughly and dried in an oven overnight before tests.

Figure 2:
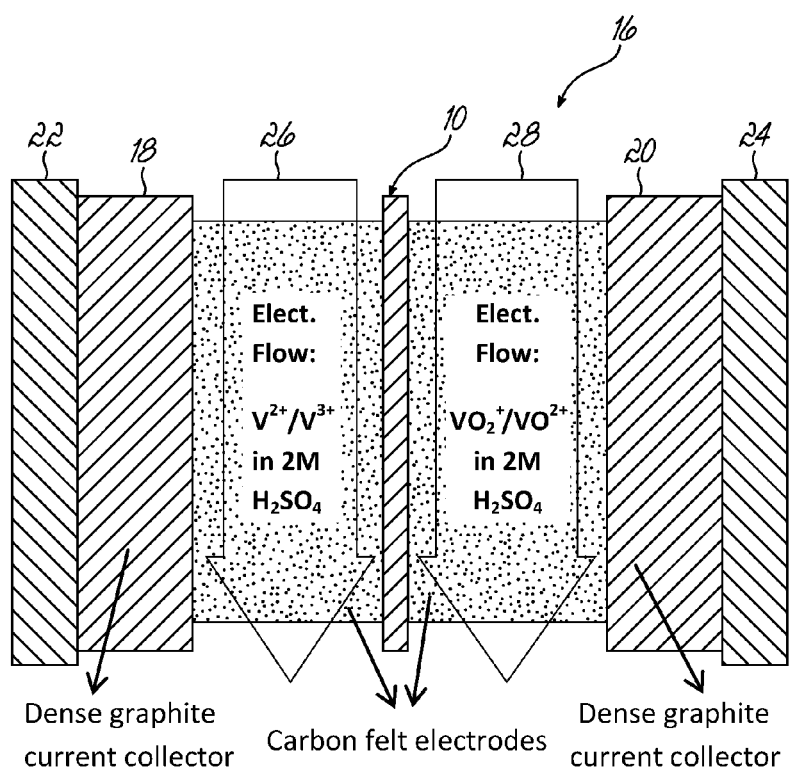
FIG. 2 is diagrammatic depiction of a redox flow battery.

The formed membrane can be used as a separator in a VRFB such as shown in FIG. 2.

As shown in FIG. 2, a vanadium redox flow battery 16 includes the separator of the present invention 10 sandwiched between two dense carbon graphite collectors 18 and 20, in turn attached to copper collecting plates 22 and 24. Between the separator 10 and the respective electrodes 18 and 20 are flow paths or chambers 26, 28 for the oxidizing and reducing reactants, in this case a vanadium variable redox flow battery. For testing purposes, the battery was attached to a Gamry Reference 6000 unit or with a multi-channel battery analyzer (not shown). The separator and electrodes were dish-shaped with a diameter of 2.5 cm, giving an active working area of 2.5 $cm^2$, excluding the edge area covered with O-ring seals. Other redox flow batteries in addition to vanadium include those listed in Table 1.

TABLE 1

Common Flow Cell Systems

| Electrochemical System | Cathode | Anode | Specific Energy, Wh/kg | Ion Exchange Membrane |
|---|---|---|---|---|
| Sodium polysulfide/bromine | $3Br^- - 2e^- \rightarrow Br_3^-$ | $S_4^{2-} + 2e^- \rightarrow 2S_2^{2-}$ | | Cation exchange membrane |
| All Vanadium | $VO_2^+ + H_2O - e^- \rightarrow VO_2^+ + 2H^+$ | $V^{3+} + e^- \rightarrow V^{2+}$ | <25 | PVDF-g-PSSA, Nafion 117 |
| Vanadium/Bromine | $2Br^+ + Cl^- - 2e^- \rightarrow ClBr_2^-$ | $VBr_3 + e^- \rightarrow VBr_2 + Br^-$ | 50 | Nafion 112 |
| Iron/Chromium | $Fe^{2+} - e^- \rightarrow Fe^{3+}$ | $Cr^{3+} + e^- \rightarrow Cr^{2+}$ | | Cation and anion exchange membrane |
| Zinc/Bromine | $3Br^- - 2e^- \rightarrow Br_3^-$ | $Zn^{2+} + 2e^- \rightarrow Zn$ | 60 | Nafion 125 or microporous membrane |
| Zinc/Cerium | | $Zn^{2+} + 2e^- \rightarrow Zn$ | | Nafion 125 |

During the testing as set out below, 20 ml of 4/7 M $VO^{2+}$ ($VOSO_4 \cdot 4-6H_2O$, 99.9%, Aldrich) sulfate solution in 4/7 M $H_2SO_4$ was circulated on the substrate side of the membrane and 20 ml of 1 M $Mg_2SO_4$ solution was circulated on the zeolite surface side. The 1 M $MgSO_4$ solution was used in the permeate side to minimize the osmotic pressure difference and maintain equivalent ionic strengths between the two sides. The pH value and $VO^{2+}$ concentration in the $Mg_2SO_4$ solution were monitored as a function of permeation time using a pH meter (Thermo Scientific Orion 320) and a UV/vis spectrometer (with actual $VO^{2+}$ detection limit of ~0.0001M), respectively. The fluxes of $H^+$ ($J_{H^+}$) and $VO^{2+}$ ($J_{V^{4+}}$) were then determined by the rates of changes in ion concentrations ($\Delta C_i/\Delta t$), $J_i = (\Delta C_i/\Delta t) \cdot V_{MgSO4} \cdot (1/A_{mem})$ where $V_{MgSO4}$ is the volume of $MgSO_4$ solution. The $H^+/VO^{2+}$ ion transport selectivity ($\alpha_{H^+/V^{4+}}$) of the IEM was thus estimated from their fluxes measured, i.e. $\alpha_{H^+/V^{4+}} = J_{H^+}/J_{V^{4+}}$.

EXAMPLE 1

Pure Silica MFI-Type Zeolite (Silicalite) Membrane for Vanadium RFB

This example demonstrates the ability of silicalite membranes, which are nonionic (i.e. no extra-framework cations inside the zeolite pores), to act as proton selective electrolyte membrane for RFBs. The tests are performed using the all-vanadium RFB system.

Membrane Preparation and Characterization

The silicalite membrane was supported on a 25-mm diameter porous α-alumina disc which had a thickness of 2 mm, porosity of $\epsilon=27\text{-}30\%$, and an average pore size of $d_p=\sim 0.07$ μm. For the in-situ synthesized silicalite membrane, the effective area $(A_{eff})$ is given by $(\epsilon \times A_m)$, where $A_m$ ($=2.54$ cm$^2$) is the straight forward area of the membrane excluding the area covered by the o-ring seals. The zeolite membrane was synthesized by in-situ crystallization from an aluminum-free precursor solution with a molar composition of $0.33(SiO_2):0.1(TPAOH):0.017(NaOH):5.56(H_2O)$. The tetrapropylammonium hydroxide (TPAOH) is the structure directing agent (SDA). The synthesis procedure is similar to that reported in our previous publication. The hydrothermal crystallization was conducted in an autoclave at 180° C. and autogenous pressure for 17 hours. The hydrothermal synthesis process was repeated for one time to minimize the intercrystalline pores after the first film growth. The membrane recovered from the synthesis solution was thoroughly washed by DI water, dried at 100° C. for overnight, and then fired at 500° C. for 6 hours to activate the zeolitic pores by burning off the SDA molecules. Although very small amount of $Al^{3+}$ ions from the substrate could incorporate into the zeolite framework near the zeolite/substrate interface, the membrane was previously verified to be aluminum-free near the outer surface. The silicalite membrane was tested by helium permeation and proton diffusion before template removal to verify the absence of pinholes. After calcination, the membrane was further tested by permeation of pure helium and a 50(v)/50(v) $CO_2/H_2$ gas mixture, respectively, at room temperature and atmospheric pressure to check the quality of the membrane.

Ion Permeation

The proton/vanadyl ion ($VO^{2+}$) transport selectivity values of the silicalite membrane, the bare alumina substrate, and commercial Nafion® 117 membrane were evaluated by the conventional diffusion experiment performed in the RFB cell described in the next section. During the measurement, 20 ml of 4/7 M $VO^{2+}$ ($VOSO_4 \cdot 4\text{-}6H_2O$, 99.9%, Aldrich) sulfate solution in 4/7 M $H_2SO_4$ was circulated on one side of the membrane and 20 ml of 1 M $MgSO_4$ solution was circulated on the other side. The 1 M $MgSO_4$ solution was used in the permeate side to minimize the osmotic pressure difference and maintain equivalent ionic strengths between the two sides. The pH value and $VO^{2+}$ concentration in the $Mg_2SO_4$ solution were continuously monitored using a pH meter (Thermo Scientific Orion 320) and a UV/vis spectrometer (with actual $VO^{2+}$ detection limit of $\sim 0.0001$M), respectively. The $H^+/VO^{2+}$ ion selectivity ($\alpha_{H^+/V^{4+}}$) of the zeolite membrane was then estimated based on their fluxes measured. A diffusion experiment was also performed for the zeolite membrane using DI water in the permeate side instead of 1 M $MgSO_4$ solution to observe the $\alpha_{H^+/V^{4+}}$ under osmotic pressure.

RFB Performance

The single cell VRFB was constructed in the apparatus described above. In charged state, the negative and positive electrolyte solutions were 10 ml of 2M $V^{2+}$ sulfate in $\sim$3M $H_2SO_4$ and 10 ml of 2M $V^{5+}$ ($VO_2^+$) sulfate solution in 1M $H_2SO_4$, respectively. These electrolyte solutions were obtained by an initial charging process using starting solutions containing 2M $VOSO_4 \cdot 4\text{-}6H_2O$ (99.9%, Aldrich) and 2M $H_2SO_4$. The performance of the silicalite membrane VRFB was evaluated through the measurements of the OCV decay curve, charge-discharge curves, and polarization curve at room temperature. The staircase I~V measurements for the polarization curves were completed typically within a short time of 30 min to ensure that no more than 2% decrease in OCV would be caused by discharge during the experiments. The total internal resistance of the Z-VRFB was estimated using the linear section of the polarization curve (also smallest slope) where changes in electrode activation and mass transport over-potentials are insignificant.

Electrical Resistance

The internal Ohmic resistances of the VRFBs equipped with the supported silicalite membrane, the bare porous α-alumina substrate, and Nafion 117 film were measured under battery operation conditions in the same cell setup (FIG. 2) by electrochemical impedance spectroscopy (EIS) using the EIS function of the Gamry Reference-600™. The electrical resistance of the silicalite membrane was also measured when both the positive and negative chambers filled and circulated with DI water, acid-free 0.5 M $VO^{2+}$ solution, and 0.5 M $VO^{2+}$ solution with 0.5M $H_2SO_4$, respectively, to verify that electrical conductivity of the zeolite membrane relies on proton transfer but not the metal ions.

Results

Zeolite Membrane

The resultant polycrystalline silicalite membrane was of random crystal orientation with a thickness of 5~8 μm according to its cross-section. The membrane had a He permeance of $\sim 10^{-11}$ mol/m$^2$·s·Pa before SDA removal, indicating that the as-synthesized membrane was free of pinholes. The proton diffusion test before firing also showed no appreciable $H^+$ transport through the membrane in 48-h which further demonstrated that no large defects existed in the membrane layer and the membrane was sealed well in the liquid environment. After template removal, the membrane exhibited a room temperature He permeance of $2.3 \times 10^{-7}$ mol/m$^2$·s·Pa and a $CO_2/H_2$ (equimolar feed) separation factor of ~0.4 that verified the complete activation of zeolitic pores without crack formation during the calcination process. These results demonstrate that the silicalite membrane was of reasonably high quality.

Proton/$VO^{2+}$ Transport Selectivity

Ion diffusion experiments were performed by circulating 20 ml solution of 0.57M $VO^{2+}$ in 0.57M $H_2SO_4$ on one side and 20 ml of 1M $MgSO_4$ solution in the other side to balance the osmotic pressures and ionic strengths. The experimental data of the diffusion tests for the silicalite membrane, bare alumina substrate, and the Nafion® 117 film are presented in FIG. 3. Vanadium ion was undetectable in the permeate side $MgSO_4$ solution after 72 h of continuous circulation while a proton ($H_3O^+$) flux of 2.13 μmol/cm$^2$·h was recorded in the same period. The characteristic light absorption peak for $VO^{2+}$ became appreciable in the $MgSO_4$ solution after 74 h but the intensity was about the UV/vis instrument detection limit (0.0001M $VO^{2+}$). The flux of $VO^{2+}$ was therefore less than 0.038 μmol/cm²·h and the $H^+/VO^{2+}$ selectivity was greater than 56 by conservative estimation. The diffusion test using DI water on the permeate side also showed no detectable $VO^{2+}$ permeation and a proton flux (2.13 μmol/cm²·h) the same as that obtained when $MgSO_4$ solution was used. Without $MgSO_4$ in the permeate side to balance the osmotic pressure, the amount of DI water decreased by about 1.15 cm³ over 36 h of operation due to water diffusion across the membrane. The minimal $VO^{2+}$ crossover likely occurred through the small amount of nanometer-sized inter-crystal pores in the polycrystalline silicalite membrane. The bare substrate showed a $H^+/VO^{2+}$ selectivity of only 1.5 due to the large pore size (0.07~0.1 μm) while the Nafion 117 exhibited a $H^+/VO^{2+}$ selectivity of 19. The substrate, because of its small porosity (0.27~0.3) and very large thickness, had an $H^+$ flux (16.8 μmol/cm²·h) lower than the Nafion membrane (67.0 μmol/cm²·h).

OCV Decay

The VRFB performance tests used 10 ml of 2.0M $V^{3+}/V^{2+}$ sulfate in 3M $H_2SO_4$ and 10 ml of $V^{4+}/V^{5+}$ sulfate solution in 1M $H_2SO_4$ as the negative and positive electrolyte solutions, respectively. The OCV of the Z-VRFB was much higher than the VRFBs equipped with the bare substrate and Nafion 117 membrane. Also, the electrolyte solutions fully charged in the Z-VRFB displayed characteristic colors of pure $V^{2+}$ (lavender) and $V^{5+}$ (yellow) solutions, indicating near 100% state of charge (SOC) achieved in Z-VRFB. In contrast, the electrolyte solutions charged in the VRFB with Nafion IEM (Nafion-VRFB) never exhibited the same level of color purity likely due to color mixing by ion crossover and perhaps lower SOC as well. The OCV of the Z-VRFB remained high and decreased only slightly (from 1.66 V to 1.50 V) over a long time period of 384 h while the bare substrate caused the OCV to drop rapidly from 1.27 to 0.88 V in just 12 h. The OCV decay rate of the Z-VRFB was also significantly slower than that of the Nafion-VRFB in which the OCV started to drop sharply in about 280 h. These observations indicate that the silicalite membrane has superior ion separation ability over the Nafion 117 IEM.

Charge-discharge Curves

Figure 4:
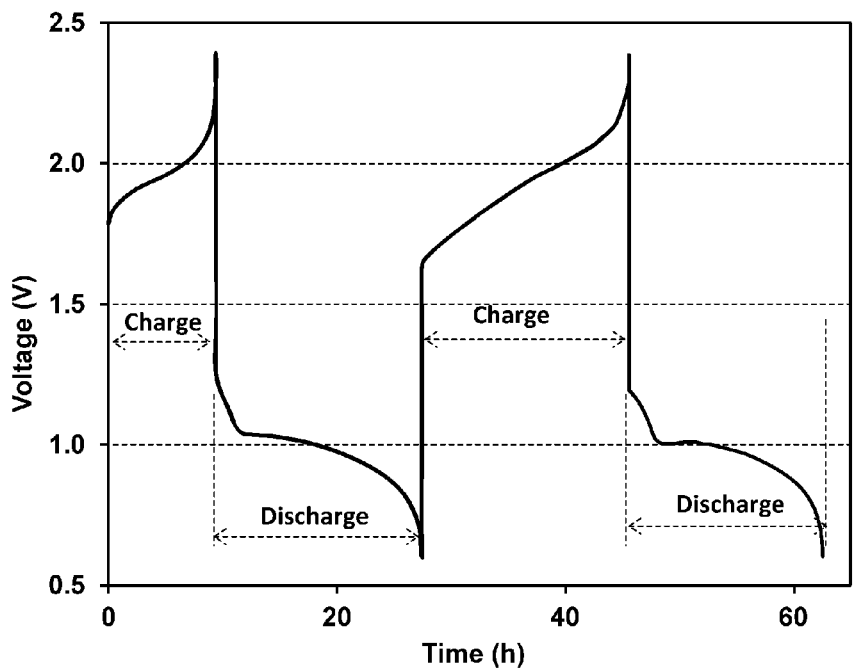
FIG. 4 is a graph showing charge discharge curves for Z-VRFB.

The charge-discharge curves were measured for the Z-VRFB using the same charging ($i_{ch}$) and discharging ($i_{disch}$) current density of 37.5 mA/cm² on the basis of active silicalite membrane area. FIG. 4 presents the result of two cycles of charge-discharge operation excluding the initial charging process for electrolyte solution preparation. The cut-off voltages for charging and discharging processes were 2.4 V and 0.6 V, respectively. The results demonstrate that the silicalite membrane was functional as electrolyte membrane for proton transport in the VRFB. Based on the second cycle in FIG. 4, the Z-VRFB achieved a charge-discharge efficiency ($\eta_C=(i_{disch} \times t_{disch})/(i_{ch} \times t_{ch})$) of 94% and average charging ($\overline{V}_{Ch}$) and discharging voltages $\overline{V}_{Disch}$ of ~1.89V and ~1.0V, respectively, which gives an energy efficiency ($\eta_E = \eta_C(\overline{V}_{disch}/\overline{V}_{ch})$) of ~50%.

The relatively low $\eta_E$ of the current Z-VRFB was mainly resulted from the large thicknesses of the silicalite membrane (5~8 μm) and the substrate (2,000 μm) as well as the big gaps (5 mm) between the membrane and electrodes, all of which are expected to cause high Ohmic resistances. The high internal resistance of the Z-VRFB cell is evidenced by the large slope of the polarization curve, where the smallest slope was about 12 Ω·cm².

Electrical Resistance

Figure 3:
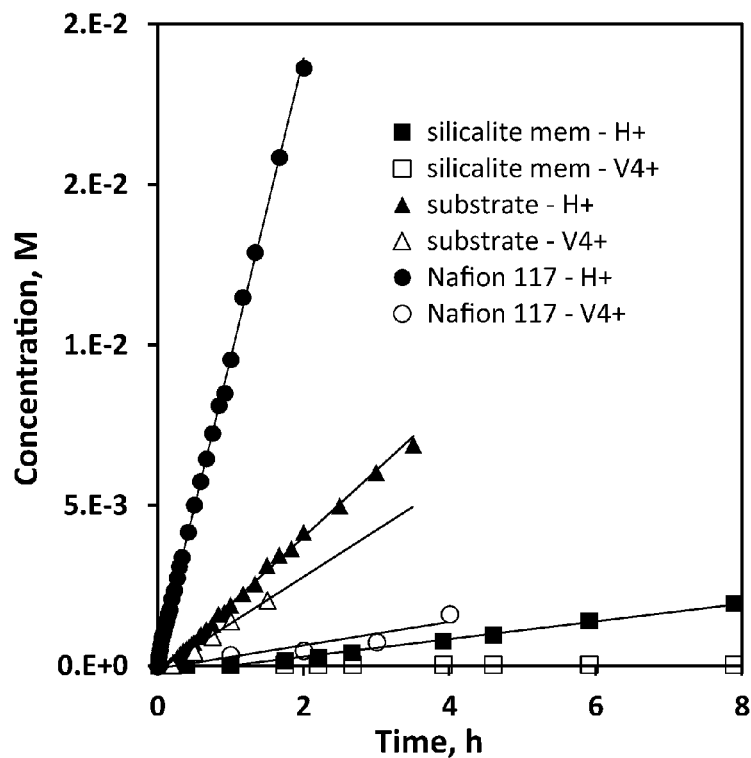

EIS measurements were performed in actual electrolyte solutions to further estimate the cell resistances for a fresh silicalite membrane, the bare substrate, and the Nafion 117 film, respectively. The internal resistances of the VRFBs equipped with the supported silicalite membrane, the bare porous alumina substrate, and the Nafion 117 membrane were 14.2 Ω, 5.7Ω, and 4.1 Ω, respectively. The resistance of the silicalite layer alone is therefore estimated to be around 8.5 Ω according to the difference between the supported silicalite membrane and bare substrate. The cell resistance with the substrate alone was 1.6 Ω greater than that of the Nafion 117 because the substrate, with a small porosity and very large thickness, had a much lower proton flux than the Nafion film (FIG. 2-4). The ASR of the Z-VRFB was ~10.8 Ω·cm² after porosity correction which was close to that found from the polarization curve. Because the Nafion 117 membrane is known to have an ASR in the order of ~1 Ω·cm², the resistance of the solution filled gaps and other factors (e.g. contact resistances) in the cell was estimated to have a large value of around 3.7 Ω in the current cell configuration.

EXAMPLE 2

ZSM-5 Membrane for RFB

In the previous Example 1, the pure silica MFI type zeolite (i.e. silicalite) membrane was demonstrated to be fully functional as an ion separator in the vanadium RFB with high proton to vanadium ion permeation selectivity. However, due to its nonionic nature, the silicalite membrane exhibited large electrical resistance that leads to low voltage efficiency. The ionic conductivity is fundamentally determined by the proton permeability ($P_{b,i}$), i.e. $P_{b,i}=C_i \times D_i$, where $C_i$ and $D_i$ are the concentration and diffusivity of exchangeable extraframework ion (e.g. proton) inside the zeolite porosity. In this example, the aluminum-containing MFI type zeolite (i.e. ZSM-5) membrane was demonstrated as an improved IEM as compared to silicalite membrane which is its structural analog with the crystallographic structure and pore size.

Membrane Preparation

The zsm-5 membrane was synthesized on a 1.2 mm thick, 2.5 cm diameter porous α-alumina disc with an average pore size of ~0.1 mm and a porosity of ~30%. The membrane was grown on the seeded substrate by secondly growth hydrothermal crystallization in a precursor solution with Si/Al atomic ration of 15. The synthesis solution contained proper amount of tetrapropylammonium hydroxide (TPAOH, 1M, Sigma-Aldrich), 60 ml of DI water and 0.458 g of $NaAlO_2$ (Sigma-Aldrich). The hydrothermal synthesis was conducted at 180° C. under autogenous pressure for 4 h. The membrane was activated by firing in air at 550° C. for 6 h after thorough cleaning in DI water.

Membrane Properties

The SEM shows that the ZSM-5 membrane surface is well-intergrowth and defect-free. The ZSM-5 membrane has a uniform membrane thickness of ~10 μm. The XRD pattern also verifies that the membrane layer is MFI-zeolite crystal phase. The energy dispersive X-ray spectroscopic (EDS) results revealed that the atomic ratios of Si:Al and Na:Al in the ZSM-5 zeolite crystals at the membrane surface were 33 and ~1.1, respectively. After ion exchange in the vanadium RFB electrolyte solutions (in 2M $H_2SO_4$), more than 95% of the extraframework $Na^+$ was found to be exchanged by $H^+$.

Electrical Resistance of ZSM-5 Membrane

When the Nafion 117 film, the nafion film with $\alpha$-$Al_2O_3$ substrate, the ZSM-5 membrane with substrate and the bare substrate, respectively, used as IEM, the total internal resistances of the cell measured by EIS were 1.5, 2.4, 1.5 and 1.8. The Ohmic resistances of the nafion 117 and the zeolite layer are estimated to be 0.9 and 1.0, respectively; and the combined resistance of other contributors from the cell was 0.4. So the ZSM-5 zeolite layer and the Nafion-117 membrane have similar resistances under the battery conditions.

ZSM-5 IEM Performance in Vanadium RFB

The ZSM-5 IEM equipped single cell vanadium RFB performance test was conducted at room temperature. The negative and positive electrolyte solutions were the same as those used in other examples of this document. Results of the charge-discharge tests at various current densities for Nafion-117 and ZSM-5 membrane were compared. The energy efficiency (EE=CE·VE) of the RFB with ZSM-5 membrane was only slightly lower than that of Nafion 117 at current densities of 40 mA/cm$^2$ and became higher than the Nafion membrane at the current densities of 30 mA/cm$^2$, 20 mA/cm$^2$ and 10 mA/cm$^2$.

When the silicalite layer is supported by a polymeric film, the silicalite nanoparticles are first formed and then embedded onto the surface or within the polymer support. Suitable polymeric supports include perfluorosulfonic acid and PBI, which are ion exchange membranes. Other polymers suitable for use to support the silicalite layer include cation exchange polymers and anion exchange polymers. The method of combining the polymeric support with the zeolite nanoparticles will vary depending upon the particular polymer. For example, the particles can be applied to a molten surface of the polymer or the particles can be blended with the polymer dissolved in a solvent. This latter method is particularly useful for formation of silicalite supported by a Nafion membrane using the following method.

EXAMPLE 3

The silicalite nanoparticles were synthesized by the in-situ hydrothermal crystallization method. The tetrapropylammonium hydroxide (TPAOH, 1M, Aldrich) was used as the structure directing agent (SDA) for silicalite crystallization. The zeolite synthesis precursor was a clear solution with a molar composition of 0.33($SiO_2$):0.1 (TPAOH):0.035 (NaOH):5.56 ($H_2O$). The hydrothermal crystallization was conducted at 120° C. for 12 h in a Teflon lined autoclave. The zeolite particles were washed by DI water and then dried and fired at 550° C. in air for 5 hours to remove the SDA. The calcined silicalite particles were re-dispersed into ethanol to obtain a suspension of 0.015 g-silicalite/ml.

The colloidal silicalite-Nafion composite membranes were prepared by the conventional solution casting method. First, the commercial Nafion-117 (Sigma-Aldrich) solution, which contained 20 wt. % Nafion-117 polymer in ethanol and water, was mixed with methanol (>99.8%, Aldrich), ethanol (>99.5%, Aldrich), and N,N-dimethylformamide (DMF, 99.8%, Aldrich) at room temperature under stirring. Second, a certain amount of the 0.015 g/ml silicalite suspension was added to the multi-solvent solution of Nafion-117 obtained in the first step under rigorous stirring at room temperature. The overall volumetric ratios of the components used in the above suspension preparation were 1.25 (Nafion-117 solution):0.75 (methanol):0.85 (ethanol):3.0 (DMF):$x_{zeo}$ (0.015 g/ml zeolite suspension). The amount of silicalite suspension $x_{zeo}$ is varied to achieve different overall zeolite contents in the final composite membranes. The thus obtained silicalite colloidal suspension in Nafion-117 solution was further dispersed by alternating the ultrasonication and mechanical stirring processes at an interval of 30 min for 3 h. The final suspension was then casted into a Teflon dish and dried in a vacuum oven at 80° C. for 20 h under an absolute pressure of 23.7 kPa followed by a 4-h drying step at 150° C. under the same pressure. The 4-h vacuum drying step at 150° C. ensures the complete removal of volatile components from the Nafion matrix and desorption of solvent molecules from the zeolitic pores. The appropriateness of desorption temperature was confirmed by the thermogravimetric analysis (TGA) tests for the solvent-adsorbed silicalite particles. The dried zeolite-Nafion composite film was carefully detached from the Teflon dish after cooling down to room temperature. The films were stored in sealed sample cases to avoid contaminations from the environment. Prior to the ion diffusion, conductivity, and RFB operation tests, the membranes were boiled in 1M $H_2SO_4$ solution for 2 h followed by soaking in the same acid solution at room temperature for 24 h. The composite membranes with two different silicalite particle contents of 5 wt. % and 15 wt. % in same amounts of Nafion were fabricated and studied in this work.

Membrane Characterizations

The colloidal silicalite-Nafion composite membranes were examined by X-ray diffraction (XRD, PANalytical X'Pert Pro diffractometer, CuK$\alpha$ 1.54060 Å radiation, Bragg-Brentano $\theta$-2$\theta$) after boiling and soaking in the 1 M $H_2SO_4$ solution to confirm the crystal phase of the zeolite particles. The scanning electron microscopy and energy dispersive X-ray spectroscopy (SEM-EDS, FEI XL-30 System, accelerating voltage 15 kV) were used to observe the membrane microstructure, estimate the film thicknesses, and analyze the zeolite distribution in the membrane. The interactions between the silicalite surface and Nafion matrix was studied by Attenuated Total Reflectance (ATR, using diamond crystal substrate) Fourier transform infrared spectroscopy (FTIR; Nicolet 7600, Thermo Scientific) in a wavenumber range of 400-4000 cm$^{-1}$.

Electrochemical impedance spectroscopic (EIS) analyses were performed in a frequency range of 100 Hz-1 MHz for the IEM-mounted VRFBs to measure the whole cell internal resistance. The internal Ohmic resistances of the entire VRFB equipped with different IEMs were measured under RFB operation conditions for the same battery cell setup, as shown in FIG. 2, using the Gamry Reference-600™ system. The proton/vanadium ion separation selectivity ($\alpha_{H+/V4+}$) was studied. The membranes were mounted between two compartments of the permeation cell and the solutions on the two sides were continuously circulated for complete mixing and minimizing concentration polarizations at the membrane surfaces. In permeation measurement, 20 ml of 4/7 M $VO^{2+}$ ($VOSO_4 \cdot 4H_2O$, 99.9%, Aldrich) sulfate solution in 4/7 M $H_2SO_4$ and 20 ml of 1 M $Mg_2SO_4$ solution was circulated in the two com 16 nts. The 1 M $MgSO_4$ solution was used in the permeate side to balance the osmotic pressure and ionic strengths between the two sides. The pH value and $VO^{2+}$ concentration in the $Mg_2SO_4$ solution were monitored as a function of permeation time using a pH meter (Thermo Scientific Orion 320) and a UV/vis spectrometer (with actual $VO^{2+}$ detection limit of ~0.0001M), respectively. The fluxes of $H^+$ ($J_{H+}$) and $VO^{2+}$ ($J_{V4+}$) were then determined by the rates of changes in ion concentrations ($\Delta C_i/\Delta t$), $J_i = (\Delta C_i/\Delta t) \cdot V_{MgSO4} \cdot (1/A_m)$ where $V_{MgSO4}$ is the volume of $MgSO_4$ solution and $A_m$ is the membrane area.

The H$^+$/VO$^{2+}$ ion transport selectivity ($\alpha_{H+/V4+}$) of the IEM was then obtained based on the ion fluxes, i.e. $\alpha_{H+/V4+}=J_{H+}/J_{V4+}$.

The charge-discharge curves of the VRFBs equipped with the silicalite-Nafion composite membranes and the commercial Nafion-117® membrane were measured at room temperature for various current densities. The negative and positive electrolyte solutions used in the experiments were 10 ml of 2M V$^{2+}$/V$^{3+}$ sulfate solution in 2M H$_2$SO$_4$ and 10 ml of 2M V$^{5+}$/V$^{4+}$ (VO$_2^+$/VO$^{2+}$) sulfate solution in 2M H$_2$SO$_4$, respectively. The composite IEMs were also tested by continued cyclic operation for over a month to evaluate the performance stability.

The SEM images of the colloidal silicalite-Nafion composite membranes with zeolite contents of 5 wt. % and 15 wt. %, which are respectively denoted as 5-ZNM and 15-ZNM hereafter. The membranes have zeolite-containing top layers of ~30 μm and zeolite-free Nafion base layers of ~90 μm thick in 5-ZNM and ~100 μm thick in 15-ZNM. The suspensions for casting the two composite membranes contained same amounts of Nafion that, without the addition of zeolite, yielded a recast pure Nafion film thickness of ~115 μm. Therefore, compared to the recast pure Nafion membrane, the total thickness of the composite membrane increased ~5 μm and ~15 μm by the inclusion of 5% and 15% zeolite content, respectively. The increases of overall thickness are close to the values estimated based on the densities of the silicalite crystal (~1.76 g/cm$^3$) and dry Nafion (~1.58 g/cm$^3$), suggesting that the silicalite inter-particle spaces were mostly filled with Nafion.

The material textures shown in the cross-section SEM images suggest that zeolite nanoparticles were concentrated within top layers of about 30-μm in thickness in both composite membranes. The EDS line scan also revealed that Si contents were distributed within 30-μm of depth from the surface and were inappreciable in the rest of the film (data not shown). The very similar thicknesses of the silicalite-containing layers in two composite membranes infer that the average zeolite packing density in the top layer of 15-ZNM was about three times that in 5-ZNM. However, the distribution of silicalite particles in both 5-ZNM and 15-ZNM exhibited concentration gradients decreasing from the highest at the surface to nearly zero at a depth of 30 μm. The elemental distributions confirmed that the inter-particle spaces of the colloidal silicalite layers were filled with Nafion molecules because fluorine and sulfur contents distributed throughout the silicalite layer including the surface.

The colloidal silicalite layer was formed by particle sedimentation at the bottom side of the composite membrane. FTIR examinations of the silicalite particles, pure Nafion film, and the dry and hydrated silicalite-Nafion composite membranes, indicated that no strong chemical bonds existed between the silicalite surface and Nafion molecules. Only weak hydrogen bonds might have formed between the zeolite surface silanol and the Nafion sulfonic acid groups under hydration as previously reported in the literature. The sedimentation process is thus expected to be in Stockes flow regime where the particle settling velocity is determined by the balance between gravitational and viscous drag forces.

Ion Permeation and Conductions

The $\alpha_{H+/V4+}$ for the commercial Nafion-117, recast pure Nafion 117, 5-ZNM, and 15-ZNM membranes, the total internal resistance (R$_{int}$) of the VRFBs equipped with these IEMs, and the estimated membrane resistance (R$_m$) are summarized in Table 2. The resistance of the RFB cell was also measured under the same condition without mounting an IEM, i.e. the two carbon-felt electrodes were in direct contact.

TABLE 2

The $\alpha_{H+/V4+}$ and R$_{int}$ of the composite EM in comparison with Nafion-117

| IEM | Total thickness, μm | $\alpha_{H+/V4+}$ | R$_{int}$, Ω | R$_m$, Ω |
|---|---|---|---|---|
| Nafion-117 ® | 183 | ~16 | 1.98 | 0.81 |
| Recast Nafion | 115 | ~17 | 1.60 | 0.43 |
| 5-ZNM | 120 | ~23 | 1.72 | 0.55 |
| 15-ZNM | 130 | ~46 | 3.40 | 2.23 |
| No IEM | NA | NA | 1.17 | NA |

The composite membrane had higher $\alpha_{H+/V4+}$ than the recast pure Nafion membrane and the commercial Nafion-117 membrane. The increase of $\alpha_{H+/V4+}$ in the composite membrane was caused primarily by the reduction of actual membrane area for VO$^{2+}$ permeation from A$_m$ (pure Nafion) to $\epsilon \times$A$_m$ (composite membranes), where $\epsilon$ is the fraction of zeolite inter-particle space at the membrane surface, whereas the area for H$^+$ permeation remained unchanged because the zeolitic pores are impermeable to hydrated multivalent vanadium ions but permeable to H$_3$O$^+$.

Figure 5A:
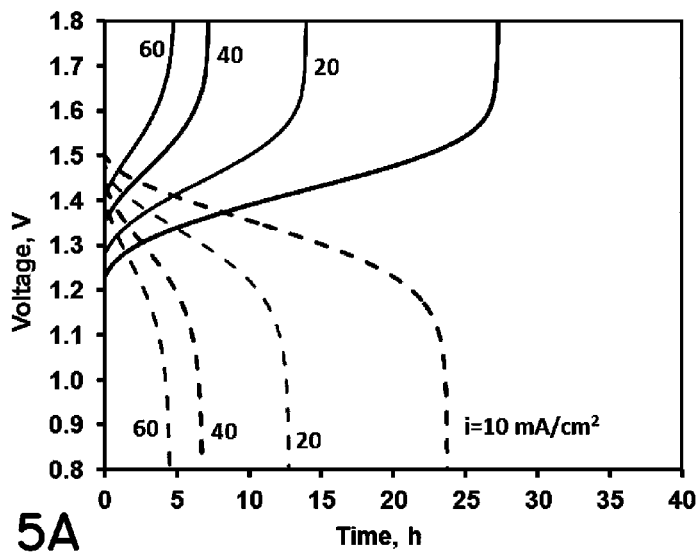
FIGS. 5(a)-5(c) are a series of graphs showing the charge discharge curves of the VRFB with (a) Nafion 117, (b) 5-ZNM and (c) 15-ZNM IEM.
Figure 5B:
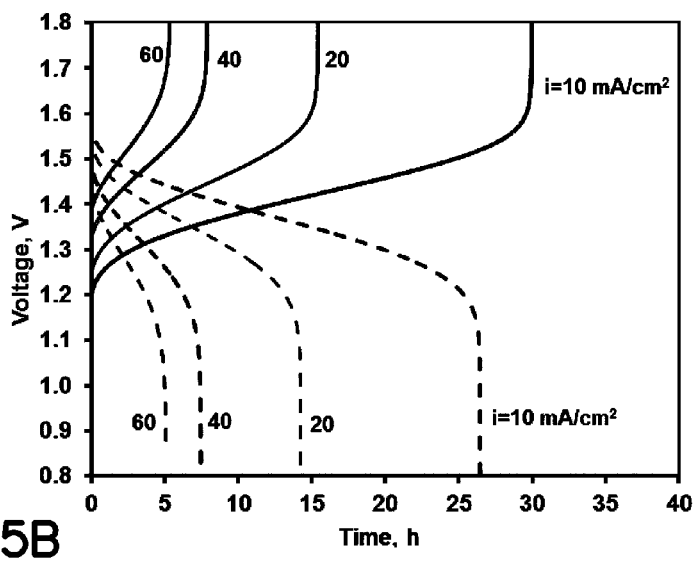
Figure 5C:
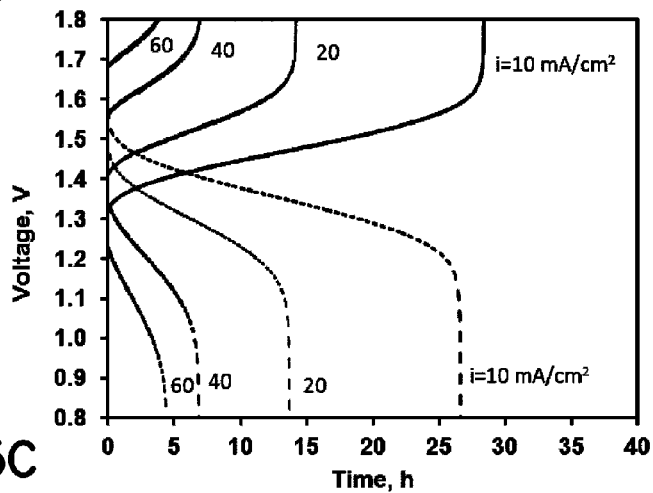
Figure 6A:
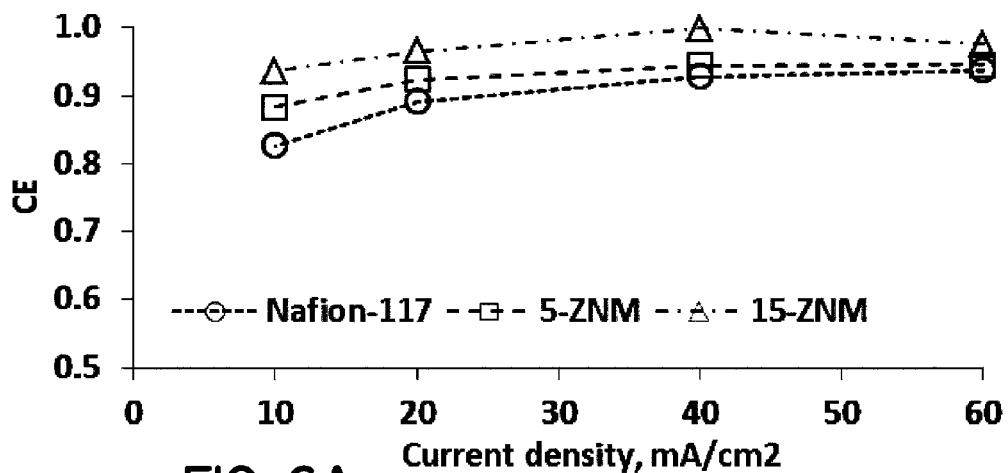
FIG. 6(a)-6(c) are a series of graphs comparing efficies between the VRFBs equipped with the 5-ZNM, 15-ZNM and a composite material having commercial Nafion 117 IEMs
Figure 6B:
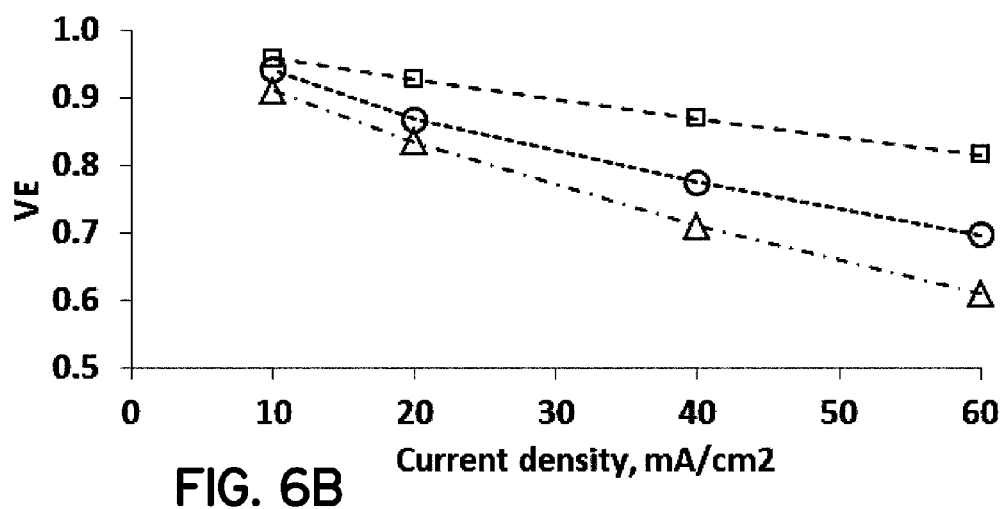
Figure 6C:
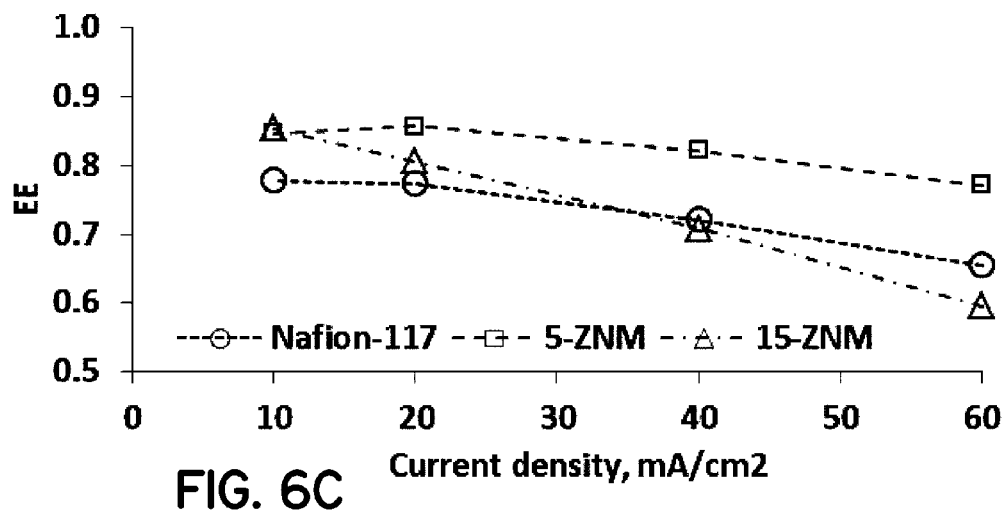

The RFB charge-discharge curves shown in FIG. 5 were measured for different IEMs, including the commercial Nafion-117, 5-ZNM, and 15-ZNM, at current densities of 10, 20, 40, and 60 mA/cm$^2$, respectively. The comparisons of Coulombic efficiency (CE), voltage efficiency (VE), and energy efficiency (EE=CE·VE) for these VRFBs are presented in FIG. 6. For IEMs, increasing the current density increased the battery CE because of reduced time for metal ion transport at high charge and discharge current densities and, in contrast, decreased the VE because of larger internal losses, such as the activation loss, Ohmic loss, and mass transfer at higher current density.

The 5-ZNM IEM achieved higher CE, VE, and EE for the RFB than the Nafion-117 IEM. The enhanced CE and VE in the 5-ZNM-equipped VRFB are attributed to its improved proton transport selectivity and electrical (proton) conductivity as compared to the Nafion-117 membrane. The 15-ZNM, although exhibited the highest proton selectivity and the best CE, showed the lowest battery VE due to its much higher Ohmic resistance as compared to the Nafion-117 and 5-ZNM. The results in FIG. 6 indicate that, for an IEM of high proton selectivity and low conductivity, the EE is higher at lower current density; whereas the battery EE is enhanced at higher current density for an IEM of low proton selectivity and high conductivity.

To evaluate the stability of the colloidal zeolite-Nafion IEM, the 5-ZNM equipped VRFB was tested for continuous cyclic operation over one month period using a constant current density of 40 mA/cm$^2$. The EE value of the battery was quite stable with a slight increase in CE and a slight decrease in VE over the 30-day period. The XRD and SEM examinations of the membrane after the test showed no appreciable changes in crystalline structure and membrane morphology (data not shown).

The nonionic silicalite membrane is permeable to proton (hydronium) in aqueous solutions and highly effective in preventing vanadium ion crossover because the hydrated multivalent metal ions are too large to enter its 0.56 nm-diameter channels. The results of this work have shown that silicate can act as an ion separator for RFBs.

Thus, as shown by the above zeolites having a high Si:Al >10 provide excellent separators for redox flow batteries. Their longevity makes them particularly useful for this application.

This has been a description of the present invention, along with preferred method of practicing the present invention, but the invention itself should only be defined by the appended claims wherein we claim:

What is claimed is:

1. A redox flow battery comprising:
   a first oxidizing reaction chamber and a second reducing reaction chamber separated by a separator;
   wherein said separator comprises a zeolite layer on a support, wherein said zeolite layer comprises aluminosilicate having a silicon to aluminum ratio of at least 10;
   wherein said battery operates on electrode reactions of dissolved redox metal ion couples separated by said separator.

2. The redox flow battery claimed in claim 1 wherein said support layer is alumina or other acid-resistant ceramic materials.

3. The redox flow battery claimed in claim 1 wherein said support layer comprises a polymer film.

4. The redox flow battery claimed in claim 3 wherein said polymer film is an ion exchange membrane.

5. The redox flow battery claimed in claim 4 wherein said ion exchange membrane is selected from the group consisting of perfluorosulfonic acid and polybenzylimidazole.

6. The redox flow battery claimed in claim 3 wherein said separator comprises from about 1% to about 70% percent zeolite and from about 99% to about 30% polymer.

7. The redox flow battery claimed in claim 2 wherein said redox flow battery is one of a vanadium battery, zinc-cerium battery, zinc-bromine battery, iron chromium battery, vanadium bromine battery and sodium polysulfide-bromine battery.

8. A redox flow battery comprising:
   a first oxidizing reaction chamber and a second reducing reaction chamber separated by a separator;
   wherein said separator comprises a zeolite layer on a support, said zeolite layer comprising aluminosilicate having a silicon to aluminum ratio of at least 10; and
   wherein said redox flow battery is one of a vanadium battery, zinc-cerium battery, zinc-bromine battery, iron chromium battery, vanadium bromine battery and sodium polysulfide-bromine battery.

9. The redox flow battery claimed in claim 8 wherein said silicon to aluminum ratio is from 10 to 50.

10. A redox flow battery comprising:
    a first oxidation reaction chamber, a second reducing reaction chamber separated by a separator;
    wherein said battery operates on electrode reactions of dissolved redox metal ion couples separated by said separator;
    wherein said separator comprises a zeolite layer on a support;
    wherein said zeolite layer has a silicon to aluminum ratio of 10 to 50.

* * * * *

UNITED STATES PATENT AND TRADEMARK OFFICE
CERTIFICATE OF CORRECTION

| | |
|---|---|
| PATENT NO. | : 9,911,985 B2 |
| APPLICATION NO. | : 14/454076 |
| DATED | : March 6, 2018 |
| INVENTOR(S) | : Junhang Dong et al. |

It is certified that error appears in the above-identified patent and that said Letters Patent is hereby corrected as shown below:

In the Specification

Column 1, Line 11 (before BACKGROUND OF THE INVENTION), insert the following:
--STATEMENT REGARDING FEDERALLY SPONSORED RESEARCH
This invention was made with government support under Contract No. NSF CBET-1263860 awarded by the National Science Foundation. The government has certain rights in the invention.--

Signed and Sealed this
Eighteenth Day of June, 2019

Andrei Iancu
*Director of the United States Patent and Trademark Office*